Figure 1:
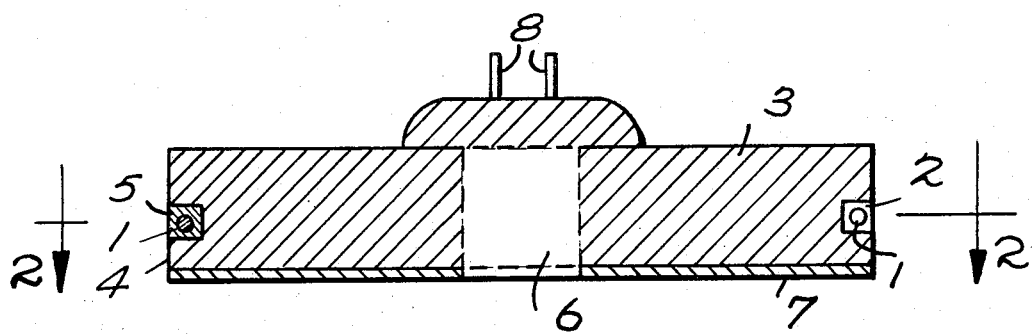

United States Patent
Scholz et al.

[11] 3,810,066
[45] May 7, 1974

[54] PRECISION RESISTANCE FOR MEASURING PURPOSES

[75] Inventors: Joachim Scholz, Grossauheim; Raudi Reber, Neuenhasslau, both of Germany

[73] Assignee: Deutsche Gold-und Silber-Scheidean-Stalt Vormals Roessler, Frankfurt am Main, Germany

[22] Filed: Aug. 17, 1973

[21] Appl. No.: 389,158

[52] U.S. Cl. ................................................. 338/25
[51] Int. Cl. ............................................ H01c 7/00
[58] Field of Search .............................. 338/22–28, 338/229, 304–305, 311; 73/362 R, 362 AR, 335, 341–342; 29/612–613; 317/9, 41

[56] References Cited
UNITED STATES PATENTS

| | | | |
|---|---|---|---|
| 2,749,753 | 6/1956 | Adams | 73/362 AR |
| 2,342,827 | 2/1944 | Ackers | 73/362 AR X |
| 3,019,404 | 1/1962 | Fastenau et al. | 73/342 X |

*Primary Examiner*—C. L. Albritton
*Attorney, Agent, or Firm*—Cushman, Darby & Cushman

[57] ABSTRACT

A rapidly responding resistance for measuring purposes which is temperature sensitive on a flat surface comprises a measuring wire in a groove which is located in the surrounding surface of a smooth, cylindrical carrier body slightly distant from the front turned toward the object to be measured.

5 Claims, 2 Drawing Figures

PATENTED MAY 7 1974

3,810,066

PRECISION RESISTANCE FOR MEASURING PURPOSES

The invention is directed to a rapidly responding temperature sensitive measuring resistance in the shape of a disc.

For the exact measuring of the surface temperature on flat surfaces or on point-like places, as for example in synthetic resin injection molding or pressure molding machines, requires the use of resistance thermometers whose resistance for measuring purposes is only temperature sensitive on a fixed, narrowly bounded surface.

Resistance thermometers in most cases are built as cylindrical bodies whereby one or more measuring coils are arranged in or on an insulator. To attain sufficient measuring exactness there is necessary a fixed minimum length of the measuring coil so that the over-all arrangement always has a fixed minimum length. An exact measurement of the temperature at a fixed point is not possible with such a resistance thermometer since there is measured only the average temperature over the entire length of the resistance coil.

Therefore, resistance thermometers have been constructed in which the resistance for measuring purposes is arranged in a good heat conducting body, for example made of copper, aluminum or silver and this for its part is broken into a protective tube made of a poor heat conducting material so that heat transfer can only take place at the bottom of the heat conducting body. Thereby a more favorable heat transfer is produced from the bottom of the heat conducting body to the measuring resistance along its entire length and a more direct heat transfer along the protective tube stopped. However, this arrangement has the disadvantage that it is expensive to produce and functional limitations are placed on miniaturization.

It has now been found according to the invention that there can be prepared a rapidly responding measuring resistance temperature sensitive on a flat surface if the measuring wire or coil is in a groove which is located in the surrounding surface of a smooth cylindrical carrier body slightly distant from the front turned toward the object to be measured. Such cylindrical carrier bodies can be produced in very small form so that the finished measuring resistance also can have a still smaller diameter.

The carrier body can consist of ceramic or an organic synthetic resin, e.g., a phenol-formaldehyde resin. The fixation of the measuring coil, which is generally spiral shaped, in the nut can take place either by means of a fused ceramic mass or a cast synthetic resin mass, e.g., a cast phenol-formaldehyde resin.

The carrier body preferably is formed in the shape of a ring so that it can be easily attached to the measuring object, for example, by screws. Furthermore, the fronts of the carrier body turned toward the measuring object can be metallized whereby a better heat transfer is obtained and the measuring resistance becomes solderable. The terminal wires advantageously are led off axially in the direction of the protective tubes.

Figure 2:
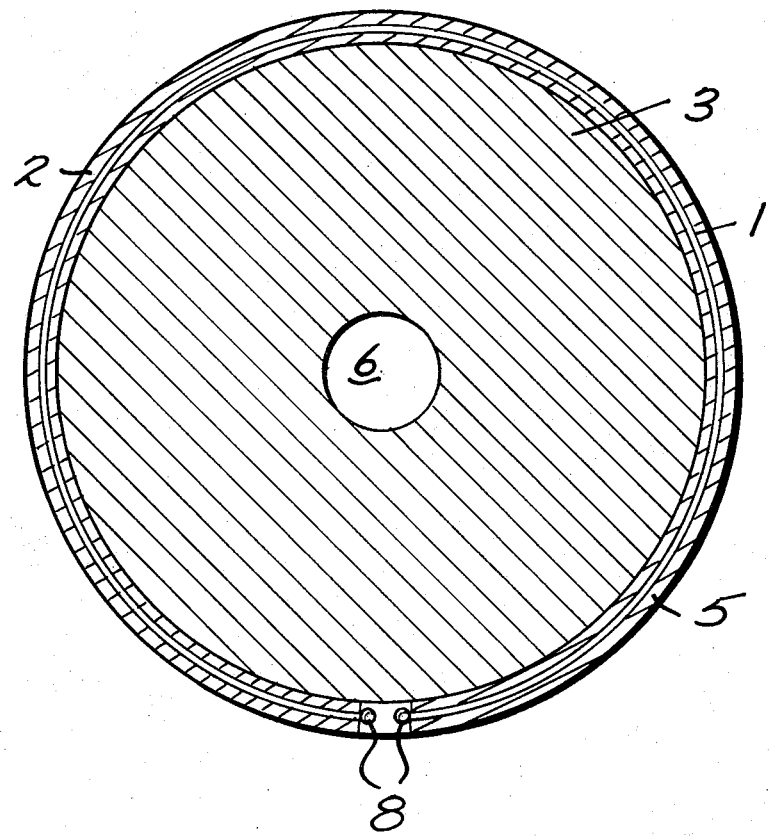

The invention will be understood best in connection with the drawings wherein:

FIG. 1 is a schematic cross-section of the measuring resistance of the invention; and FIG. 2 is a longitudinal section along the line 2—2 of FIG. 1.

Referring more specifically to the drawings the measuring coil 1 lies in a groove 2 which is located in the surrounding surface of a smooth or planar faced cylindrical carrier body 4 slightly distant from the front thereof turned toward, i.e., facing, the object to be measured. The fixing of the measuring coil 1 in the nut 2 is accomplished by means of a fused ceramic mass 5 or a sealing compound made of a synthetic resin. The carrier body 3 is preferably formed in the shape of a ring so that there is formed a hole 6 therethrough for the purpose of easier fastening. The front 4 turned toward the measuring object can also carry a thin metal layer, 7, e.g., of copper or aluminum. The leading off of the terminal wires 8 takes place axially.

What is claimed is:

1. A rapidly responding body resistance for measuring purposes which is temperature sensitive on a flat surface comprising measuring coil means disposed in a groove, said groove being located in the peripheral surface of a planar faced cylindrical carrier body, said carrier body having a front end face arranged to face the object to be measured said groove being situated a slight distance from said front.

2. A measuring resistance according to claim 1 wherein the carrier body consists of ceramic and the measuring wire is secured with a fused ceramic mass.

3. A measuring resistance according to claim 1 wherein the carrier body is ring shaped and has an axial opening therein.

4. A measuring resistance according to claim 3, wherein a thin metal layer is disposed on the front of the carrier body turned toward the measuring object.

5. A measuring resistance according to claim 1 wherein a thin metal layer is disposed on the front of the carrier body turned toward the measuring object.

* * * * *